United States Patent
Cano

(10) Patent No.: US 9,851,050 B1
(45) Date of Patent: Dec. 26, 2017

(54) UMBRELLA MOUNTING SYSTEM

(71) Applicant: Luis Cano, Diamond Bar, CA (US)

(72) Inventor: Luis Cano, Diamond Bar, CA (US)

( * ) Notice: Subject to any disclaimer, the term of this patent is extended or adjusted under 35 U.S.C. 154(b) by 0 days.

(21) Appl. No.: 15/353,816

(22) Filed: Nov. 17, 2016

(51) Int. Cl.
 *F16M 13/02* (2006.01)
 *B62B 5/00* (2006.01)
 *A47C 7/66* (2006.01)
 *A45B 11/00* (2006.01)

(52) U.S. Cl.
 CPC ........... *F16M 13/022* (2013.01); *A45B 11/00* (2013.01); *A47C 7/66* (2013.01); *B62B 5/0013* (2013.01)

(58) Field of Classification Search
 CPC ...... B62B 5/0013; A47C 7/66; F16M 13/022; A45B 11/00
 USPC ............ 248/534, 200.1, 207, 539, 536, 535; 135/16, 88.02
 See application file for complete search history.

(56) References Cited

U.S. PATENT DOCUMENTS

| | | | |
|---|---|---|---|
| 5,040,763 A * | 8/1991 | Wilson ................. | H01Q 1/1207 224/275 |
| D330,630 S * | 11/1992 | Loden .............................. | D3/10 |
| 5,255,954 A * | 10/1993 | Rogers ..................... | A47C 7/66 135/96 |
| D352,390 S | 11/1994 | Shrum | |
| 5,609,321 A * | 3/1997 | McClellan ............. | A45B 11/00 248/215 |
| 6,105,594 A * | 8/2000 | Diaz ...................... | A45B 11/00 135/16 |
| 6,113,129 A * | 9/2000 | Marques ................... | B62B 1/12 248/129 |
| 6,199,819 B1 | 3/2001 | Churillo | |
| 6,244,557 B1 | 6/2001 | Maze | |
| 7,201,442 B1 * | 4/2007 | Decosta, Jr. ............. | A47C 7/66 135/16 |
| 7,226,126 B1 * | 6/2007 | Spanovich ............. | A47C 4/286 135/96 |
| 7,395,828 B1 * | 7/2008 | Pulley .................... | A45B 11/00 135/16 |
| 7,631,654 B2 | 12/2009 | Blumenthal et al. | |
| 9,476,541 B1 * | 10/2016 | Kastner .................. | F16M 13/02 |
| 2007/0096004 A1 | 5/2007 | Quiambao, Jr. | |
| 2012/0073615 A1 * | 3/2012 | Fletcher ................. | A45B 11/00 135/16 |
| 2016/0257327 A1 * | 9/2016 | Gayk, Jr. .................. | B62B 1/12 |

\* cited by examiner

*Primary Examiner* — Anita M King

(57) ABSTRACT

An umbrella mounting system for PURPOSE includes a cart that may be urged along a support surface. The cart has a plurality of horizontal members. An umbrella is provided that has a shaft and a canopy. A mounting unit is removably coupled to the cart. The mounting unit insertably receives the shaft such that the canopy is positioned over the cart. Thus, the umbrella shades an area around the cart.

2 Claims, 5 Drawing Sheets

UMBRELLA MOUNTING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to umbrella devices and more particularly pertains to a new umbrella device for attaching an umbrella to a cart.

BRIEF SUMMARY OF THE INVENTION

An embodiment of the disclosure meets the needs presented above by generally comprising a cart that may be urged along a support surface. The cart has a plurality of horizontal members. An umbrella is provided that has a shaft and a canopy. A mounting unit is removably coupled to the cart. The mounting unit insertably receives the shaft such that the canopy is positioned over the cart. Thus, the umbrella shades an area around the cart.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
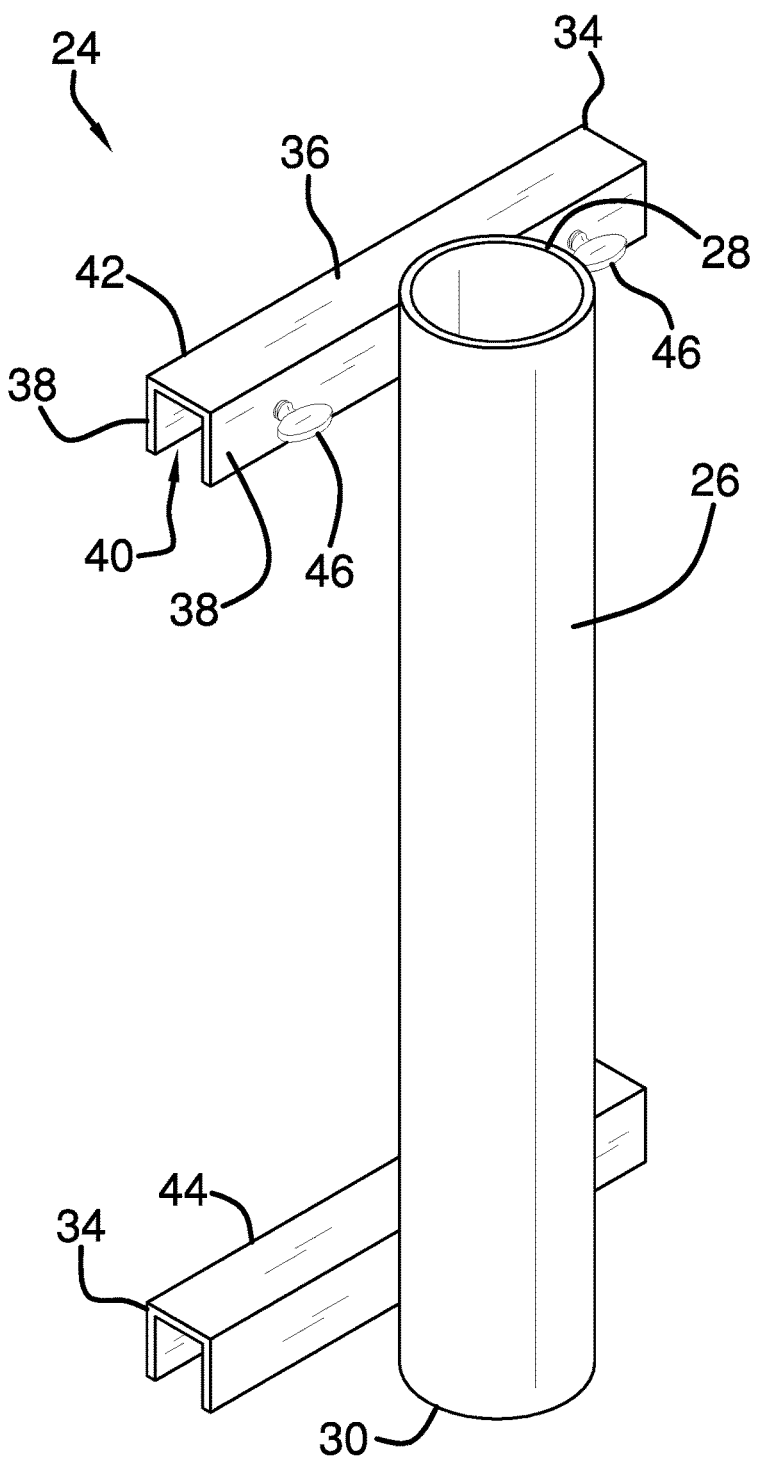
FIG. 1 is a perspective view of a mounting unit of an umbrella mounting system according to an embodiment of the disclosure.
Figure 2:
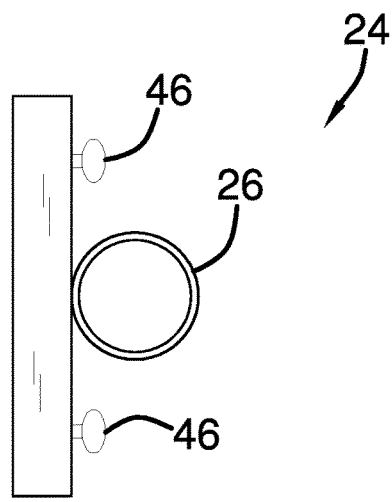
FIG. 2 is a top view of a mounting unit of an embodiment of the disclosure.
Figure 3:
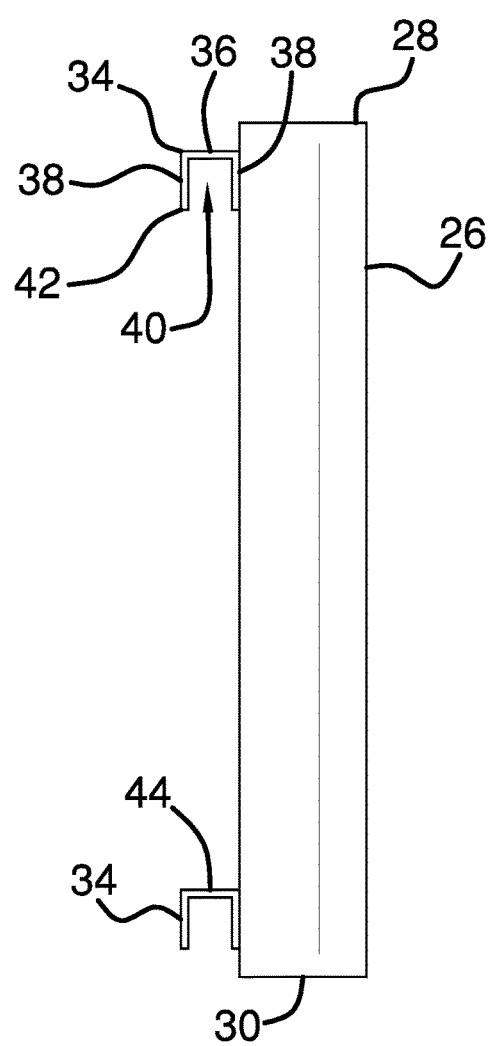
FIG. 3 is a right side view of a mounting unit of an embodiment of the disclosure.
Figure 4:
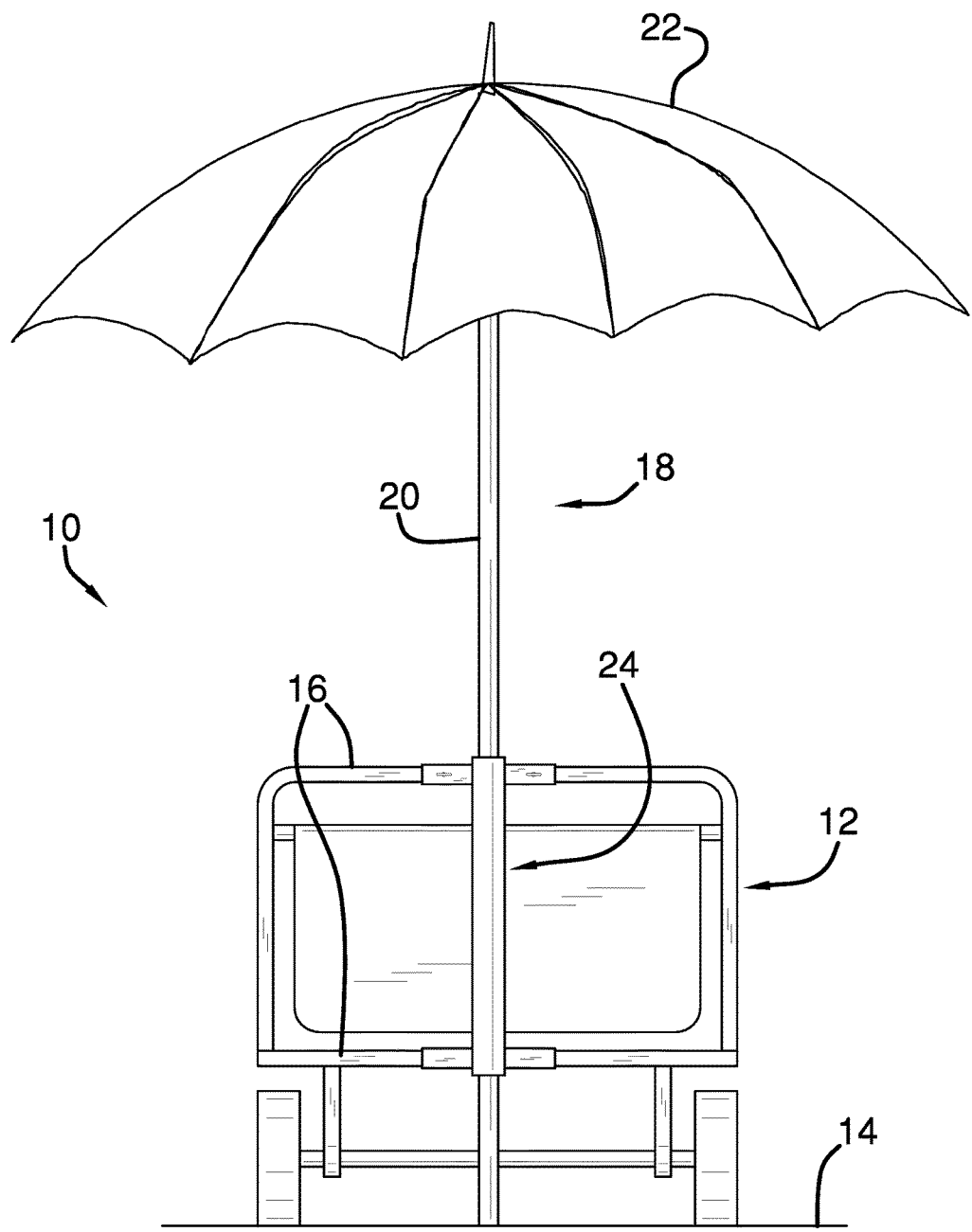
FIG. 4 is a perspective in-use view of an embodiment of the disclosure.

With reference now to the drawings, and in particular to FIGS. 1 through 6 thereof, a new umbrella device embodying the principles and concepts of an embodiment of the disclosure and generally designated by the reference numeral 10 will be described.

As best illustrated in FIGS. 1 through 6, the umbrella mounting system 10 generally comprises a cart 12 that may be urged along a support surface 14. The support surface 14 may be ground or the like. The cart 12 has a plurality of horizontal members 16 and the cart 12 may be a beach cart or the like. An umbrella 18 is provided that has a shaft 20 and a canopy 22.

A mounting unit 24 is provided and the mounting unit 24 is removably coupled to the cart 12. The mounting unit 24 insertably receives the shaft 20 such that the canopy 22 is positioned over the cart 12. Thus, the umbrella 18 shades an area around the cart 12.

The mounting unit 24 comprises a sleeve 26 that has a first end 28, a second end 30 and an outer surface 32 extending therebetween. Each of the first end 28 and the second end 30 is open and the sleeve 26 insertably receives the shaft 20 on the umbrella 18. A pair of saddles 34 is provided and each of the saddles 34 has a central panel 36 extending between a pair of end panels 38. The end panels 38 are spaced apart from each other to define a space 40 between each of the end panels 38.

Each of the saddles 34 is coupled to the outer surface 32 of the sleeve 26. Each of the saddles is oriented perpendicular to the sleeve 26 having each of the end panels 38 corresponding to each of the saddles 34 being directed downwardly. Each of the saddles 34 engages an associated one of the horizontal members 16 having the associated horizontal member 16 being positioned in the space 40 in associated saddle 34. The pair of saddles 34 includes a first saddle 42 and a second saddle 44. The first saddle 42 is positioned closer to the first end 28 than the second end 30. The second saddle 44 is positioned closer to the second end 30 than the first end 28.

A pair of fasteners 46 is provided and each of the fasteners 46 is movably coupled to an associated one of the end panels 38 corresponding to the first saddle 42. Each of the fasteners 46 is selectively manipulated. Each of the fasteners 46 engages the cart 12 when the first saddle 42 is positioned on the cart 12 such that the first saddle 42 is retained on the cart 12. Each of the fasteners 46 may comprise a thumb screw or the like.

Figure 5:
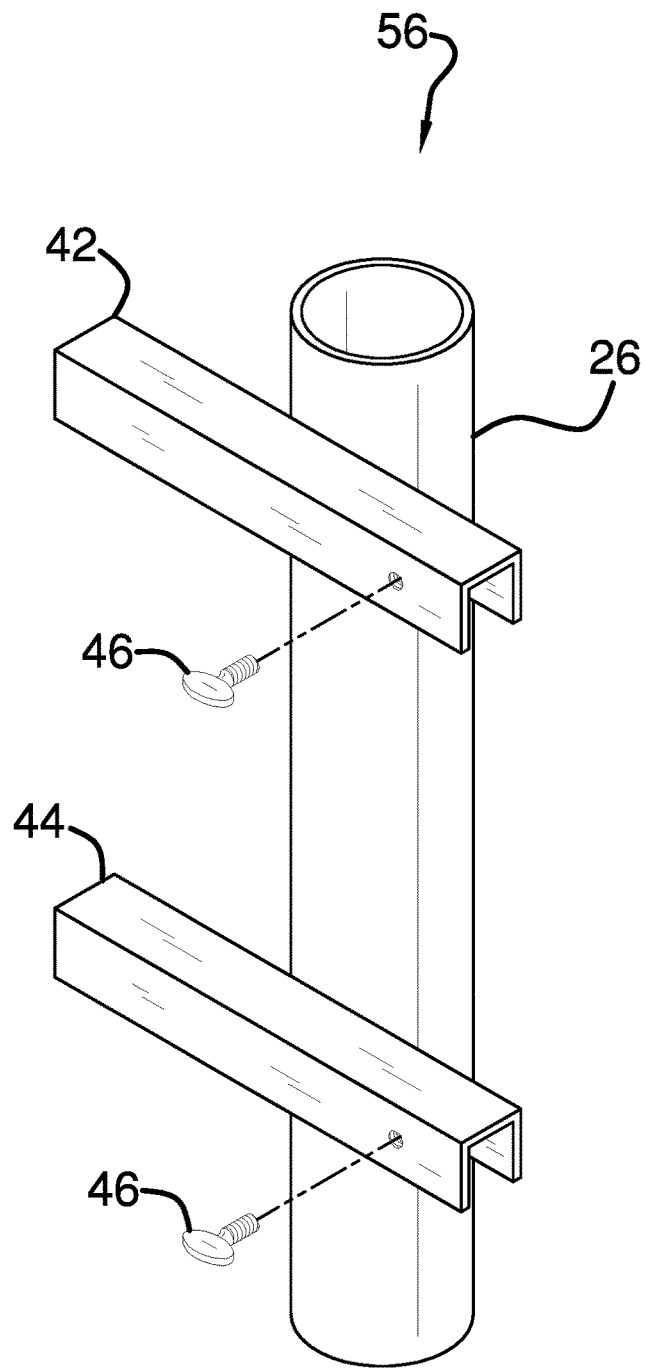
FIG. 5 is a back perspective view of an embodiment of the disclosure.
Figure 6:
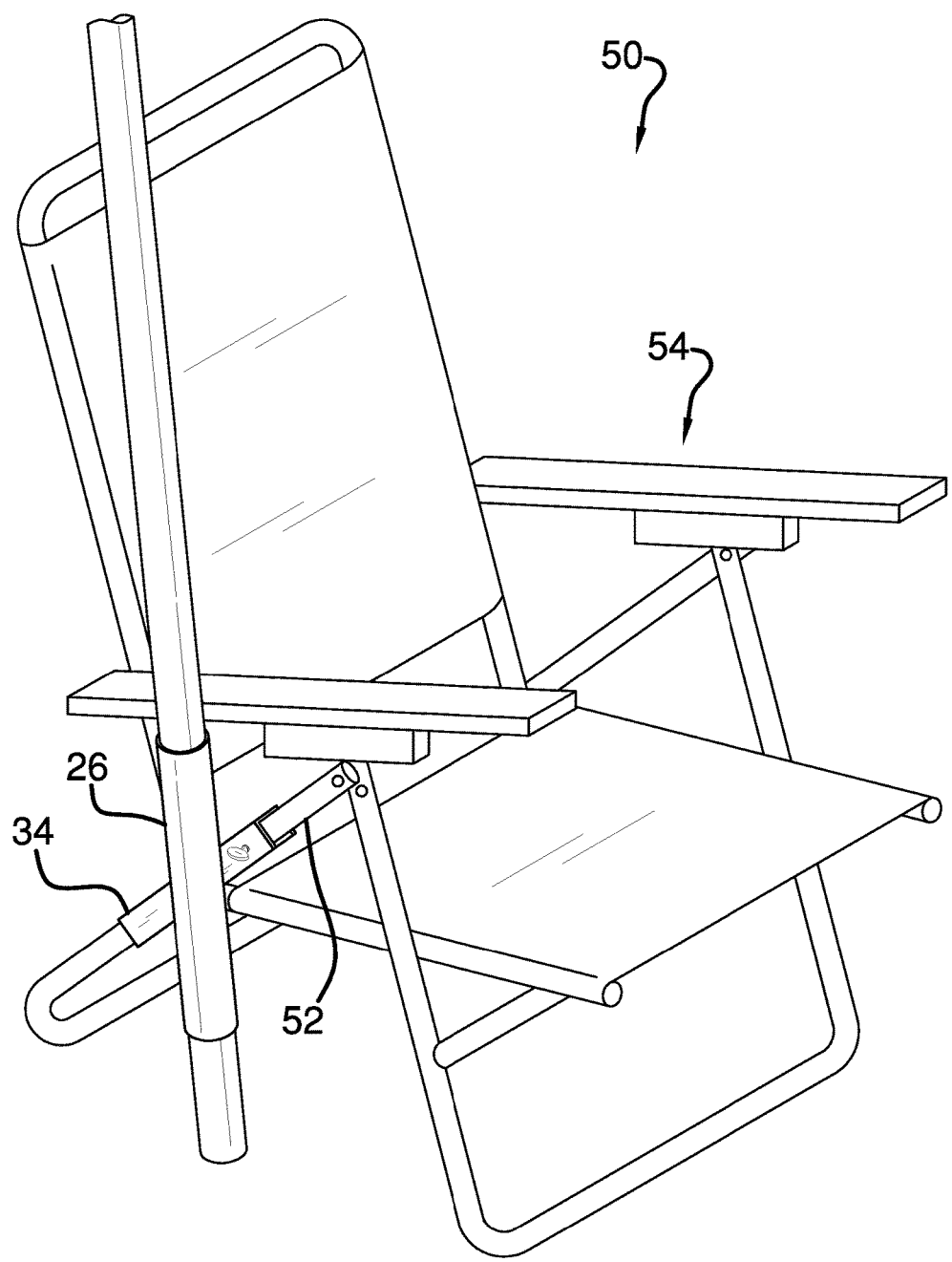
FIG. 6 is a perspective in-use view of an alternative embodiment of the disclosure.

In an alternative embodiment 50 as shown in FIG. 6, only one saddle 34 may be coupled to the sleeve 26. The saddle 34 may be oriented at an angle with respect to the sleeve 26. The saddle 34 may engage a support member 52 on a lawn chair 54. Thus, the canopy 22 of the umbrella 18 may be positioned above the lawn chair 54 when the shaft 20 of the umbrella 18 is positioned in the sleeve 26. In an alternative embodiment 56 as shown in FIG. 5, each of the fasteners 46 may be positioned on an associated one of the first 42 and second 44 saddles.

In use, each of the first 42 and second 44 saddles is positioned on an associated one of the horizontal members 16. Each of the fasteners 46 are manipulated to retain the sleeve 26 on the cart 12. The shaft 20 of the umbrella 18 is inserted into the sleeve 26. Thus, the canopy 22 is positioned over the cart 12 to shade the area around the cart 12.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An umbrella mounting system comprising:
a cart being configured to be urged along a support surface, said cart having a plurality of horizontal members;
an umbrella having a shaft and a canopy;
a mounting unit being removably coupled to said cart, said mounting unit insertably receiving said shaft such that said canopy is positioned over said cart wherein said umbrella is configured to shade an area around said cart, said mounting unit including a sleeve, said sleeve having an outer surface, said sleeve having a first end and a second end;
a pair of saddles, each of said saddles having a central panel extending between a pair of end panels, said end panels being spaced apart from each other to define a space between each of said end panels, each of said saddles is coupled to said outer surface of said sleeve, each of said saddles being oriented perpendicular to said sleeve having each of said end panels corresponding to each of said saddles being directed downwardly, each of said channels engaging an associated one of said horizontal members, said pair of saddles including a first saddle and a second saddle, said first saddle being positioned closer to said first end than said second end, said second saddle being positioned closer to said second end than said first end; and
a pair of fasteners, each of said fasteners being movably coupled to an associated one of said end panels corresponding to said first saddle wherein each of said fasteners is configured to be manipulated, each of said fasteners engaging said cart when said first saddle is positioned on said cart such that said first saddle is retained on said cart.

2. An umbrella mounting system comprising:
a cart being configured to be urged along a support surface, said cart having a plurality of horizontal members;
an umbrella having a shaft and a canopy; and
a mounting unit being removably coupled to said cart, said mounting unit insertably receiving said shaft such that said canopy is positioned over said cart wherein said umbrella is configured to shade an area around said cart, said mounting unit comprising:
a sleeve having a first end, a second end and an outer surface extending therebetween, each of said first end and said second end being open, said sleeve insertably receiving said shaft on said umbrella,
a pair of saddles, each of said saddles having a central panel extending between a pair of end panels, said end panels being spaced apart from each other to define a space between each of said end panels, each of said saddles being coupled to said outer surface of said sleeve, each of said saddles being oriented perpendicular to said sleeve having each of said end panels corresponding to each of said saddles being directed downwardly, each of said saddles engaging an associated one of said horizontal members, said pair of saddles including a first saddle and a second saddle, said first saddle being positioned closer to said first end than said second end, said second saddle being positioned closer to said second end than said first end,
a pair of fasteners, each of said fasteners being movably coupled to an associated one of said end panels corresponding to said first saddle wherein each of said fasteners is configured to be manipulated, each of said fasteners engaging said cart when said first saddle is positioned on said cart such that said first saddle is retained on said cart, and
a pair of second fasteners, each of said second fasteners being movably coupled to an associated one of said end panels corresponding to said second saddle wherein each of said second fasteners is configured to be manipulated, each of said fasteners engaging said cart when said second saddle is positioned on said cart such that said second saddle is retained on said cart.

* * * * *